United States Patent [19]

Califano et al.

[11] 3,803,017
[45] Apr. 9, 1974

[54] METHOD AND APPARATUS FOR LOOSENING WET PIPE FROM A MANDREL

[75] Inventors: Frank L. Califano, Hackensack, N.J.; Paul N. Shutak, Ridgefield, Conn.; Herbert A. Dalik, Pomona, N.J.

[73] Assignee: The Flintkote Company, White Plaines, N.Y.

[22] Filed: Sept. 28, 1972

[21] Appl. No.: 293,012

[52] U.S. Cl............ 204/180 R, 204/130, 204/300, 162/192
[51] Int. Cl............................................ B01d 13/02
[58] Field of Search........ 204/180 R, 130, 299, 300; 162/192

[56] References Cited
UNITED STATES PATENTS
2,372,575  3/1945  Hayward............... 204/180 R X
3,193,450  7/1965  Herbert et al. ............... 204/130 X Primary Examiner—John H. Mack
Assistant Examiner—A. C. Prescott
Attorney, Agent, or Firm—Curtis, Morris & Safford

[57] ABSTRACT

A method and apparatus for loosening wet pipe from a mandrel wherein wet, cementitious pipe which has been formed about a hollow mandrel is loosened from the mandrel by causing a flow of a relatively high amperage direct electrical current through the wet pipe to the mandrel. The mandrel is rotatably supported within the apparatus on an endless belt made of electrically conductive material which provides a continuous surface of contact and the flow of electrical current is maintained through the belt while the wet cementitious pipe on the mandrel is rotated therein. The flow of the current through the pipe causes a loosening of the pipe on the mandrel in a relatively short period of time.

17 Claims, 4 Drawing Figures

METHOD AND APPARATUS FOR LOOSENING WET PIPE FROM A MANDREL

The present invention relates to a method and apparatus for loosening articles of manufacture which are formed on a mandrel or mold from a pulp or plastic stock and more particularly the present invention relates to a method and apparatus for loosening such articles from the mandrels on which they are formed.

While the present invention will be described hereinafter with reference to the specific example of loosening a wet cementitious pipe such as asbestos-cement pipe from a mandrel, it is to be expressly understood that the present invention is applicable in principle to the manufacture of other similar wet molded articles.

In the manufacture of asbestos-cement pipes a wet sheet of asbestos-cement pulp is wound on a rotating hollow mandrel while high pressure is applied thereto. After a pipe of suitable wall thickness has been formed, the pipe and mandrel are removed from the press and the formed pipe is then removed from the mandrel for curing. Because high pressures are applied during the winding operation a firm bond develops between the pipe and the mandrel and the breaking of this bond to permit removal of the pipe without distorting the pipe or cracking or otherwise damaging its inner surface has posed a difficult problem.

Some of the methods heretofore employed for loosening the formed pipe from the mandrel on which it was formed have included coating the mandrel with oil or wax in an attempt to prevent the forming of a bond between the pipe and the mandrel, blowing air under pressure between the formed pipe and the mandrel while subjecting the pipe to a calendaring action, developing a thin film of gas or vapor between the pipe and mandrel so as to effect a uniform slight expansion of the pipe away from the mandrel or as disclosed in U.S. Pat. No. 2,892,750 flowing a relatively high amperage direct electrical current from a plurality of electrically conductive spaced rolling contact members through the wet pipe.

While the latter described method of loosening wet cementitious pipe from a mandrel has been found to be more satisfactory than some of the other methods, problems still persist with this method because of the limited surface area of contact between the electrically conductive rolling elements and the wet cementitious pipe.

Accordingly, it is an object of the present invention to provide a method and apparatus to loosen wet cementitious pipe from a mandrel in a manner which overcomes the inherent deficiencies of prior art methods.

A further object of the present invention is to provide a method and apparatus for loosening wet cementitious pipe from a mandrel by providing a high surface area of electrical contact about the wet cementitious pipe and causing a relatively high amperage direct electrical current to flow through the pipe to loosen the pipe from the mandrel.

In accordance with a preferred embodiment of the present invention an apparatus is provided to rotatably support the ends of the mandrel upon which a wet cementitious pipe has been formed. An endless belt of substantial length of an electrically conductive material is provided and the wet cementitious pipe and mandrel is positioned to rest on the belt. Suitable electrical contacts are provided so that a flow of high amperage electrical current is provided through the electrically conductive belt and onto the pipe and the belt is rotated thereby rotating the mandrel and pipe to insure that the total circumference of the pipe has electrical current passed through it.

These and other objects and advantages of the present invention will be more fully understood after reference is made to the following specification and the accompanying drawings in which.

Figure 1:
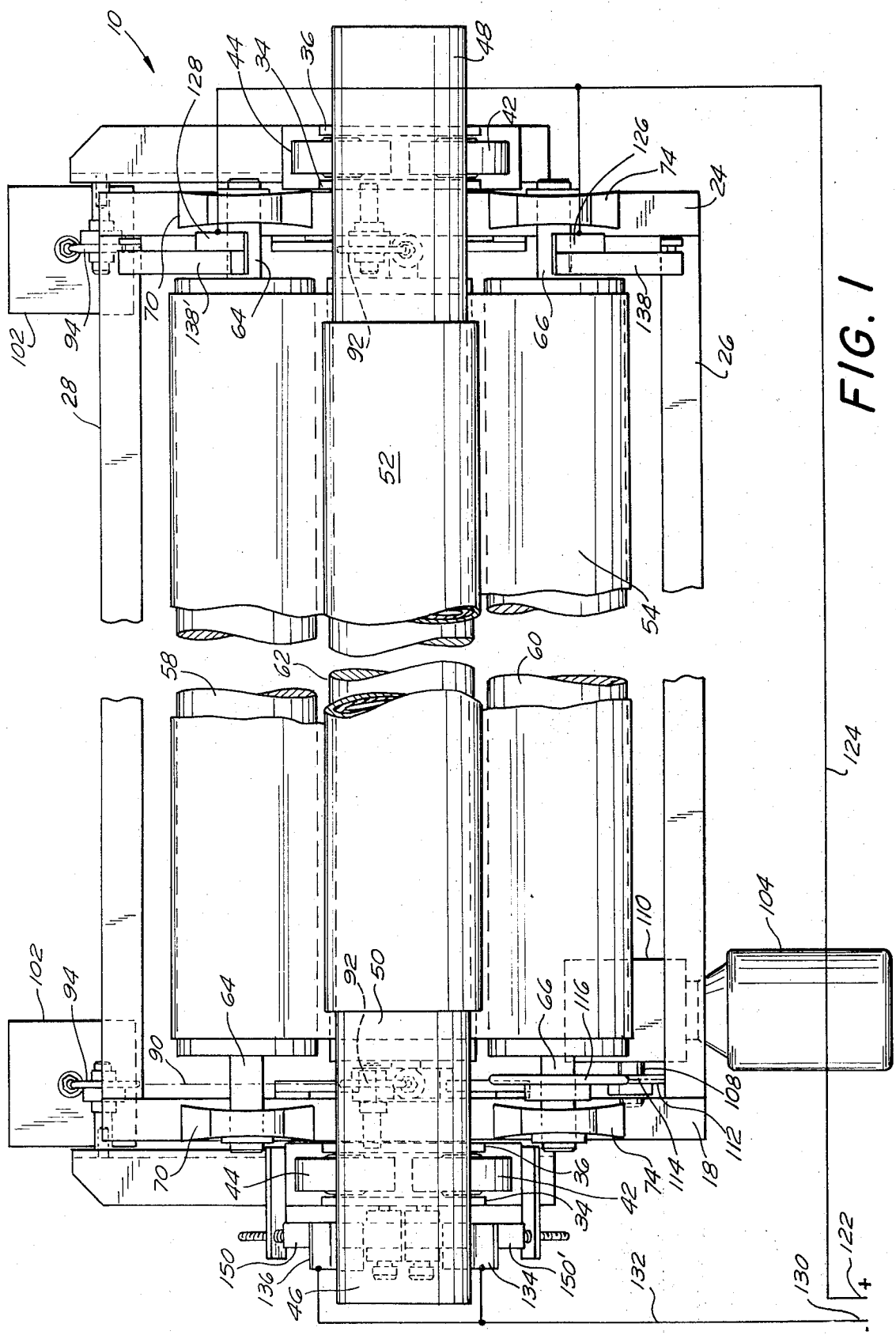
FIG. 1 is a top plan view of the apparatus of the present invention.
Figure 2:
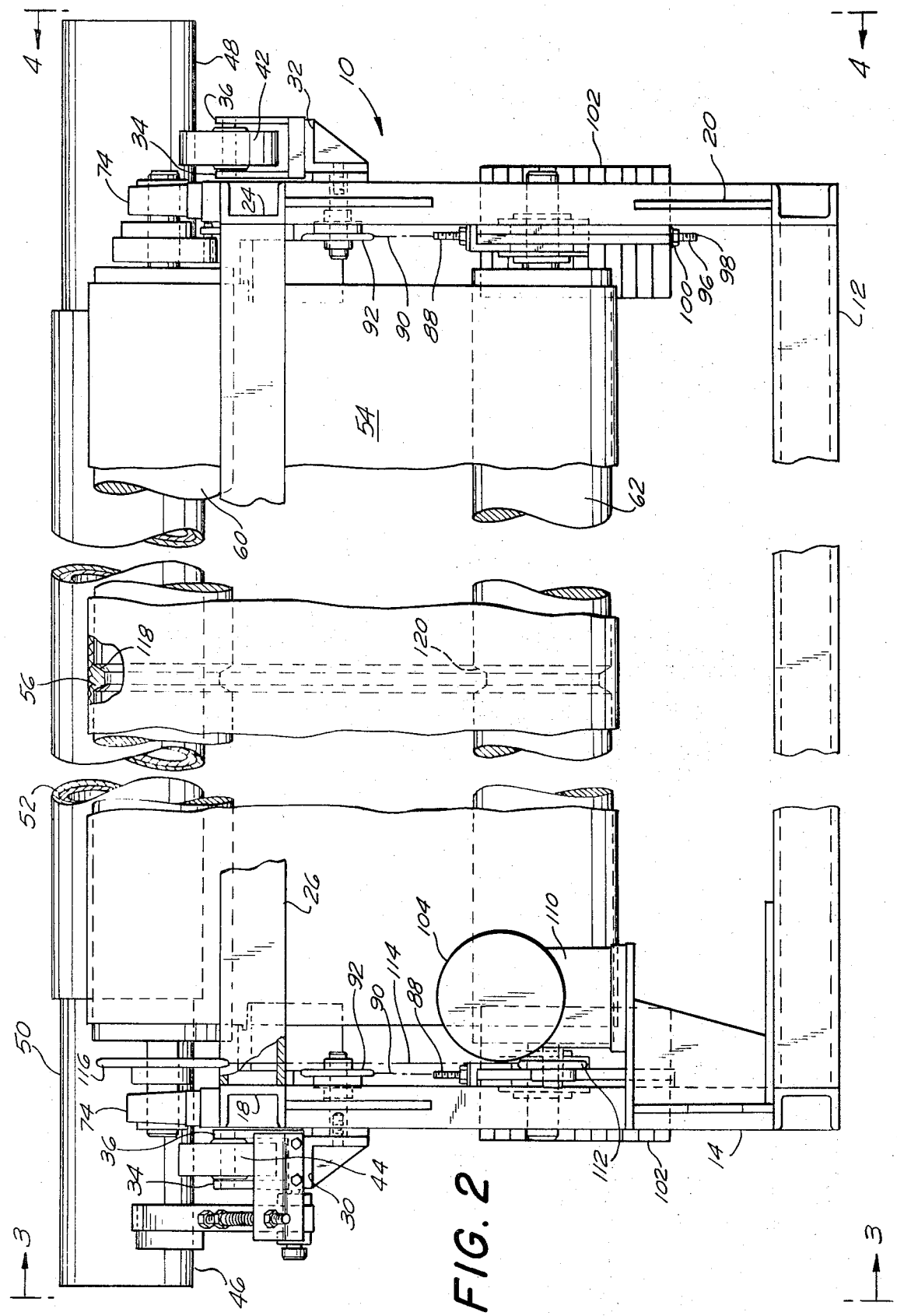
FIG. 2 is a side elevational view of the apparatus of the present invention.

With reference to the drawings and particularly FIGS. 1 and 2, an apparatus for loosening wet pipe from a mandrel 10 is shown and includes a support framework comprising a base frame 12. Spaced vertically disposed frame members 14 and 16 are supported on the base frame 12 at one end and, in turn, support a horizontal support member 18. At the other end of base frame 12 spaced vertically disposed support members 20 and 22 are provided extending upwardly from base frame 12 and, in turn, members 20 and 22 support a horizontal support member 24. In addition spaced upper horizontally disposed members 26 and 28 interconnect the upper horizontal support members 18 and 24.

According to the method and apparatus of the present invention, a wet cementitious pipe which has been wound and rolled upon a mandrel is loosened from the mandrel by passing a high amperage direct current through the wet pipe and mandrel. Accordingly, the apparatus of the present invention provides a means to support a mandrel upon which has been wound a cementitious pipe material and also provides a means to pass a high amperage direct current uniformly through a significant area of the pipe and mandrel.

Thus, the apparatus includes provision to support the wet cementitious pipe and mandrel comprising horizontally disposed support members 30 and 32 secured respectively to the upstanding support members 14, 16 and 20, 22. Each of the horizontal support members 30 and 32 support a pair of spaced vertically disposed plate members 34 and 36. Shaft members 38 and 40 are each rotatably journaled through plates 34 and 36 and hub members 42 and 44 are secured to the shafts 38 and 40, respectively. The hubs 42 and 44 are spaced from each other to support the ends 46 and 48 of the cylindrically shaped mandrel 50 upon which the wet cementitious pipe covering 52 has been rolled.

The mandrel 50 is a hollow cylindrical member preferably of steel and is supported within the apparatus 10 by the rotatably disposed hubs 42 and 44 at each end 46 and 48 of the mandrel. Since the supports for the mandrel 50 are the circular hubs 42 and 44 in contact with the circular perimeter of the mandrel itself, the mandrel 50 and pipe 52 wrapped thereon are rotatably supported within the apparatus.

Figure 3:
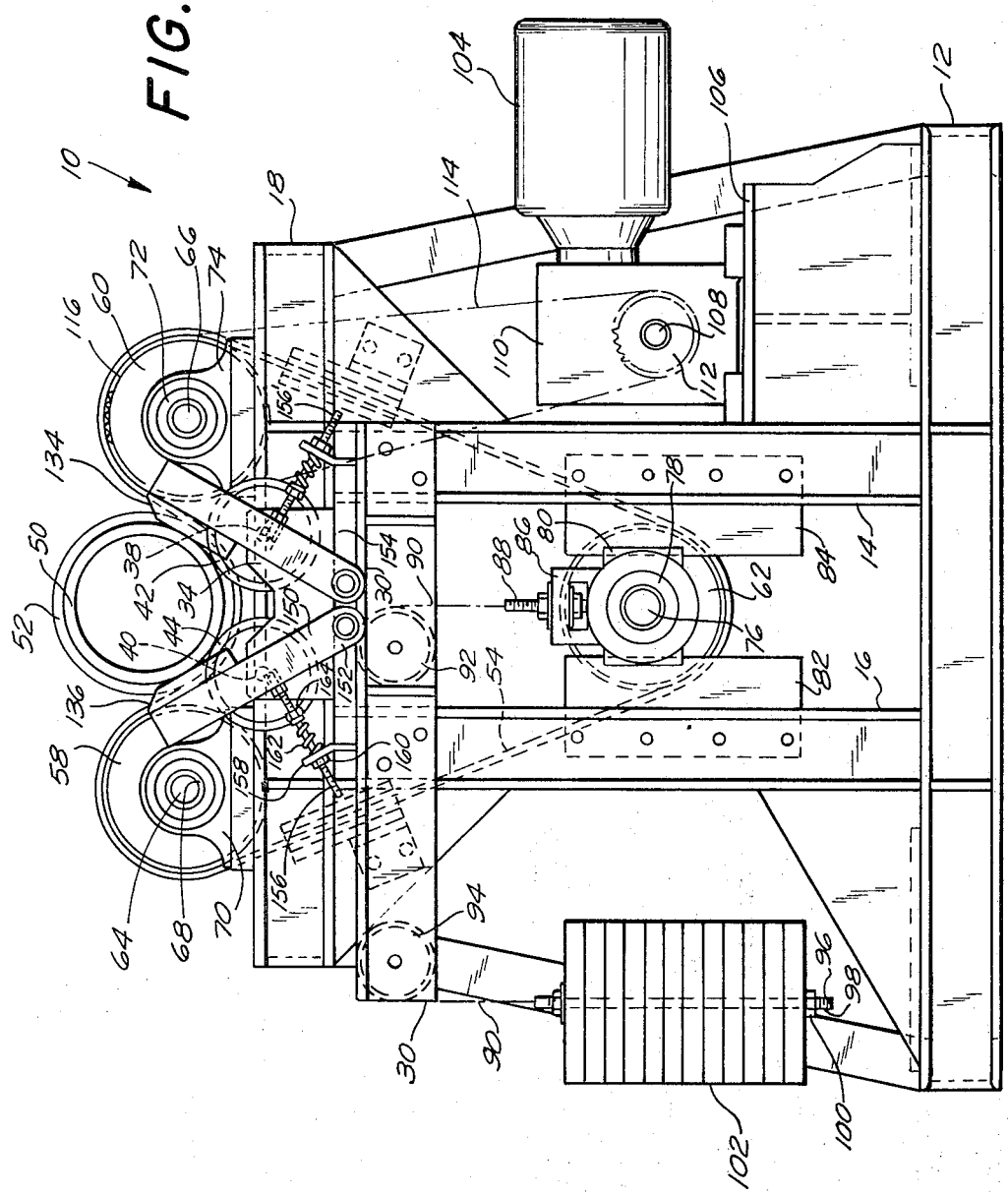
FIG. 3 is an end elevation taken on the line 3—3 of FIG. 2.

According to the present invention, the electrical contact surface through which the high amperage direct current is passed through the wet cementitious pipe covering 52 and the mandrel 50 is in the form of an endless belt 54 of an electrically conductive material. Belt 54 comprises a mesh 56 of a double twist stainless steel cable embedded in a flexible electrically conductive material which preferably is a rubber polymer such as ethylene propylene diene terpolymer. As best seen in FIGS. 2 and 3, belt 54 is disposed about three guide rolls 58, 60 and 62 with the pipe 52 and mandrel 50 disposed to rest upon the belt 54 so that belt 54 contacts from 140° to 160° of the peripheral surface of pipe 52.

The guide rolls 58 and 60 are fixed to shaft members 64 and 66, respectively. Shaft 64 is rotatably journaled at each end in journal bearings 68 supported in pillow blocks 70 mounted, respectively, on support members 18 and 24. In like manner, shaft 66 is rotatably journaled at each end in journal bearings 72 supported in the pillow blocks 74 on support members 18 and 24, respectively. Thus, the belt guide rolls 58 and 60 are rotatably supported within the apparatus.

The guide roll 62 is fixed to a shaft member 76 which is rotatably journaled at each end within journal bearings 78 secured in bearing housings 80. Each of the bearing housings 80 are vertically slidably disposed between guide plates 82 and 84 fixed respectively to the vertical support members 14, 16 and 20, 22. Thus, guide roll 62 is movable vertically so that the belt 54 can be properly tensioned when a mandrel 50 with a wet cementitious pipe covering 52 is nested within the upper portion of the belt 54.

Since the mandrel 50 rests on the rotating hubs 42 and 44, the weight of the guide roll assembly of roll 62 on the belt 54 would create a high tension force on the belt which would tend to lift the mandrel 50 off the support of the hubs 42 and 44 and create an excessive tension force in the belt 54 so that the belt could not be driven. Accordingly, the weight of the guide roll 62 is offset by a counterbalance system so that only a slight tensioning force is imparted to belt 54 by the weight of the guide roll 62. Each bearing housing 80 includes a support housing 86 on its upper side in which is threadably engaged a screw member 88 to which is attached a cable member 90. The cable member passes over pulleys 92 and 94 which are rotatably secured, respectively, to horizontal support members 30 and 32 and the other end of each cable 90 is secured to a counterweight support rod 96. The rod 96 is provided with a threaded end 98 on which is engaged a nut 100 with the nut 100 supporting a plurality of plates 102 which act as counterweights. Thus, separate weights 102 are added to the counterweight assembly until the proper degree of tension in belt 54 is obtained.

A motor 104 is provided secured to a motor platform 106 within the apparatus. Motor 104 drives an output shaft 108 through a gear housing 110 and drives a drive gear 112 secured to the output shaft 108. An endless drive chain 114 is driven by gear 112 and the drive chain drives a gear 116 secured to support shaft 66 of guide roll 60. When motor 104 operates, gear 116 is driven to rotate guide roll 60 and because belt 53 is tensioned, and is frictionally engaged on the guide roll 60, the belt is driven and as it moves it rotates mandrel 50 and the cementitious pipe 52 thereabout.

As best seen in FIG. 2, belt 54 is molded with a V-shaped protrusion 118 on one side of the belt and the V-shaped protrusion 118 fits within V-shaped depressions 120 formed in each of the guide rolls 58, 60 and 62. The V-shaped protrusion 118 of belt 54 cooperates with the V-shaped indentations in the guide rolls to positively position the belt in the apparatus and preclude lateral slippage of the belt during operation.

As noted above, the pipe 52 is loosened from its bond with mandrel 50 when high amperage direct current is caused to flow through the wet pipe. As best shown in FIG. 1, the positive terminal 122 of a d.c. electrical energy source is connected by a line 124 to electrical contact members 126 and 128 which contact the shafts 64 and 66 of guide rolls 58 and 60 while the negative or ground terminal of the d.c. source 130 is connected by a line 132 to electrical contacts 134 and 136 in contact with the mandrel 50.

Figure 4:
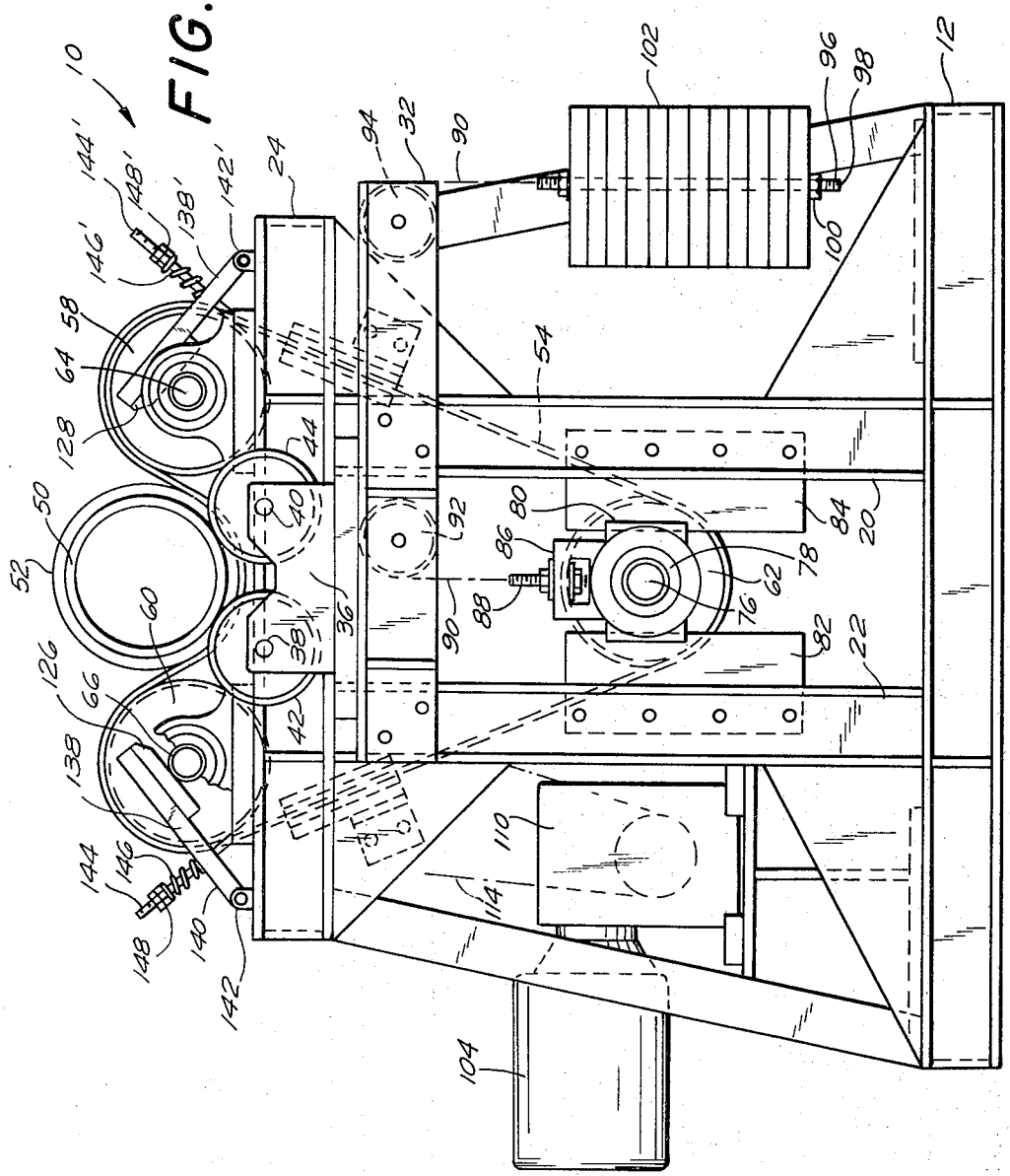
FIG. 4 is an end elevation taken on the line 4—4 of FIG. 2.

Reference is made to FIGS. 3 and 4 as well where it is seen that electrical contact 126 is mounted on a support arm 138 which is pivotally secured at its end 140 to a mounting 142 on horizontal support member 24. A rod member 144 extends through the support arm 138 and is fixed to horizontal support member 24. Rod 144 is threaded and a compression spring member 146 is placed over the rod 144 and a nut 148 is threadably engaged on rod 144. One end of spring 146 abuts against the support arm 138 and the other end of the spring abuts against the nut 148 to compliantly urge the support arm 138 and contact 126 toward the shaft 58 to maintain the electrical contact member 126 in firm abutting relationship to the shaft 58. In like manner contact 128 is maintained in contact with shaft 60 by a similar arrangement as shown in the drawings with the same numeric designation with a prime designation.

Electrical contacts 134 and 136 are also compliantly urged to maintain contact with the mandrel 50. Electrical contact 136 is mounted on a support arm 150 pivotally secured at one end 152 to a support block 154 mounted on horizontal support member 30. A threaded rod member 156 is secured to a mid-portion of support arm 150 and is disposed through an extending lug member 158 secured to support member 30. A nut 160 is threadably engaged on rod 156 and bears against the lug 158 to position support arm 150 and a compression spring 162 positioned about rod 156 bears against the other side of the lug 158 and a nut 164 engaged on rod 156 to resiliently urge support arm 150 and electrical contact 136 against the periphery of mandrel 50. In like manner electrical contact 134 is also urged into intimate contact with mandrel 50 as shown in the drawings where like numerals with a prime designation refer to like elements.

Hub members 42 and 44 are preferably provided with a non-electrically conductive covering around their perimeter to insulate the mandrel support members from the positive charge imposed upon the apparatus through the contacts 126 and 128. Since hub members 42 and 44 are the sole support for the mandrel within the apparatus other than the contact with belt 54, current flow through the pipe and mandrel is initiated only at the surfaces of the pipe in contact with belt 54.

It has been found that using the apparatus of the present invention where the source of electrical energy is between about 40 to 70 volts and develops a current flow of 50 to 125 amperes will effectively loosen wet asbestos-cement pipe from a mandrel in from 10 to 25 seconds.

Thus, the present invention provides a method and apparatus for quickly and effectively loosening the bond between wet cementitious pipe wound about a mandrel without cracking or mechanically working the pipe segment.

Since the pipe and mandrel are rotated within the apparatus by a flexible belt in frictional contact with the pipe along the length of the pipe and the belt contacts a significant portion of the periphery of the pipe, the belt also imparts a gentle calendering action to the pipe and mandrel which assists the loosening of the bond initiated by the flow of current through the pipe. Because the belt is flexible and contacts a significant portion of the pipe periphery, excessive mechanical working or inducement of high localized stress concentrations in the pipe are effectively precluded.

Additionally, it is noted that when the pipe and mandrel leave the pipe forming operation, the tail end of the last wrap of the cement impregnated fabric used to form the pipe extends outwardly from the formed pipe along the whole extent. Heretofore, an additional rolling operation was necessary to roll the extending tail of the last wrap smooth. With the apparatus of the present invention it has been found that no additional forming operation is needed as the calendering action imparted to the pipe and mandrel by the flexible belt satisfactorily smooths down the tail end of the last wrap onto the pipe.

What is claimed is:

1. Apparatus for loosening a wet cementitious pipe from a mandrel to which it is bonded comprising,
   support means in said apparatus to rotatably support said pipe and mandrel,
   electrically conductive endless belt means associated with said apparatus to contact said pipe continuously about a significant portion of the peripheral extent of said pipe along the length thereof when said pipe and mandrel are supported within said apparatus,
   a source of direct current electrical energy,
   means electrically connecting said electrically conductive endless belt means to the positive terminal of said source, and,
   means electrically connecting said mandrel to the negative terminal of said source when said pipe and mandrel are supported in said apparatus to induce a flow of current through said pipe and mandrel thereby to loosen the bond between said pipe and said mandrel.

2. Apparatus as defined in claim 1 wherein said electrically conductive means to contact said pipe comprises an endless belt of an electrically conductive composition.

3. Apparatus as defined in claim 2 wherein said belt is disposed within said apparatus about a plurality of rotatable guide roll members, said pipe and mandrel being nested within said belt between two of said guide rolls.

4. Apparatus as defined in claim 3 including means to rotatably drive at least one of said guide roll members thereby to drive said belt and rotate said pipe and mandrel nested within said belt to insure current flow throughout the whole peripheral extent of said pipe and mandrel.

5. Apparatus as defined in claim 4 including means to selectively tension said belt to maintain frictional contact between said belt and said guide rolls to permit said belt to be readily driven and to maintain effective contact between said belt and said pipe and mandrel.

6. Apparatus for loosening a wet cementitious pipe from a mandrel to which it is bonded comprising,
   a support frame for said apparatus,
   support means associated with said frame to rotatably support said pipe and mandrel at each end of said mandrel,
   an endless belt of an electrically conductive material disposed within said apparatus about a plurality of belt guide rolls,
   said belt guide rolls being rotatably supported at each end on said frame,
   said endless belt disposed to contact said pipe continuously about a significant portion of the peripheral extent of said pipe along the length thereof,
   means associated with said electrically conductive belt adapted to be connected to the positive terminal of a source of direct current electrical energy,
   means adapted to electrically connect said mandrel to the negative terminal of said electrical energy source when said pipe and mandrel are supported in said apparatus whereby a flow of current is induced through said pipe and mandrel thereby to loosen the bond between said pipe and said mandrel.

7. Apparatus as defined in claim 6 wherein a first and second guide rolls of said plurality of guide rolls are rotatably mounted on said frame support in fixed positions disposed on each side of said pipe and mandrel and said belt passes over said first guide roll, under said pipe and mandrel and over said second guide roll whereby said pipe and mandrel is disposed in nesting relationship on said belt.

8. Apparatus as defined in claim 7 including means within said apparatus to rotate said first guide roll thereby driving said belt about said guide rolls thereby to effect a rotation of said pipe and mandrel to insure the flow of current through the total peripheral extent of said pipe.

9. Apparatus as defined in claim 8 wherein a third guide roll of said plurality of guide rolls is rotatably disposed within said apparatus below said pipe and mandrel, said belt adapted to pass under said third guide roll and said third guide roll being vertically movably mounted within said frame.

10. Apparatus as defined in claim 9 including means to counterbalance the weight of said third guide roll on said belt thereby to control the tension in said belt.

11. Apparatus as defined in claim 9 wherein said belt is formed with a protrusion on one side thereof and each of said guide rolls are formed with a correspondingly shaped indentation around the periphery of said roll whereby said protrusion is disposed within said indentations thereby to position said belt within said apparatus and preclude lateral shifting of said belt when said belt is driven.

12. Apparatus as defined in claim 8 wherein said means associated with said electrically conductive belt adapted to be connected to said source of electrical energy includes electrical contact elements positioned to contact the shafts of each said first and second guide rolls, said means adapted to connect said mandrel to said source of electrical energy includes contact elements positioned to contact said mandrel when said pipe and mandrel are supported in said apparatus whereby current flow is through said guide rolls to said belt and through said pipe and mandrel.

13. Apparatus as defined in claim 12 wherein said electrical contact elements are carried by support arms pivotally secured to said frame and each said support arm includes means to resiliently urge said support arm and electrical contact element toward the member it contacts.

14. A method for loosening wet cementitious pipe from a mandrel to which it is bonded comprising,
rotatably supporting the pipe and mandrel in nesting relationship within a portion of an endless belt of an electrically conductive material so that said belt contacts a significant portion of the periphery of the pipe along the length thereof,
establishing an electrical connection between said belt and the positive terminal of a direct current electrical source and also between said mandrel and the negative terminal of said source,
driving said belt to rotate said pipe and mandrel nested therein and thereby loosening the bond between said pipe and mandrel by causing a direct current to flow through said electrical connections, and the total peripheral extent of said pipe and mandrel.

15. A method as defined in claim 14 wherein said belt contacts between 140° to 160° of the peripheral extent of said pipe.

16. A method as defined in claim 14 wherein the current caused to flow through said pipe and mandrel is between 50 to 125 amperes.

17. A method as defined in claim 14 including imparting a calendering action to said pipe and mandrel while said belt is driven to assist in loosening said pipe and said mandrel and to smooth out the exterior surface of said pipe.

* * * * *